No. 660,782. Patented Oct. 30, 1900.
O. STRÜMPELL.
MOUNT FOR NATURAL HISTORY SPECIMENS.
(Application filed Jan. 21, 1899. Renewed Mar. 20, 1900.)
(No Model.)
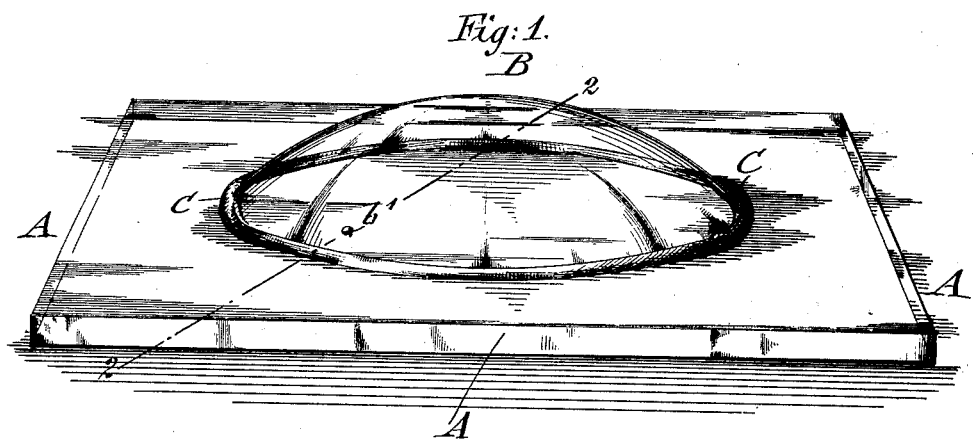
Fig: 1.
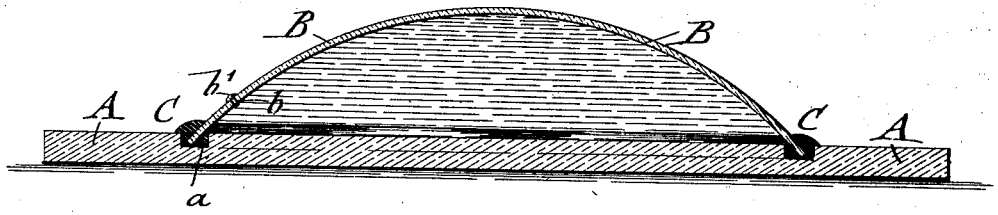
Fig: 2.
WITNESSES:
M. Henry Nantzel.
George Geibel.
INVENTOR
Oscar Strümpell
BY
ATTORNEYS.

UNITED STATES PATENT OFFICE.

OSCAR STRÜMPELL, OF NEW YORK, N. Y., ASSIGNOR OF ONE-HALF TO WILLIAM A. SCHMIDT, OF SAME PLACE.

MOUNT FOR NATURAL-HISTORY SPECIMENS.

SPECIFICATION forming part of Letters Patent No. 660,782, dated October 30, 1900.

Application filed January 21, 1899. Renewed March 20, 1900. Serial No. 9,454. (No model.)

*To all whom it may concern:*

Be it known that I, OSCAR STRÜMPELL, a citizen of Germany, residing in the city of New York, borough of Manhattan, State of New York, have invented certain new and useful Improvements in Mounts for Natural-History Specimens, of which the following is a specification.

This invention relates to an improved mount for natural-history specimens, in which the specimens can be preserved either in a dry state or in a preserving liquid in such a manner that they can be readily removed from or replaced into the mount and in which the formation of air-bubbles within the mount is entirely obviated, so that a better-looking mount is obtained; and the invention consists of a mount for natural-history specimens composed of a base-plate provided with a circular or other groove and a convex face-plate fitted into said groove and provided with an aperture near its circumference and a cement ring for hermetically sealing the convex face-plate into the groove of the base-plate.

The invention consists, further, in providing the convex face-plate with a small filling-opening for introducing the preserving liquid and with a cement plug in said aperture for closing the same.

In the accompanying drawings, Figure 1 represents a perspective view of my improved mount for natural-history specimens; and Fig. 2 is a vertical longitudinal section of the same on line 2 2, Fig. 1.

Similar letters of reference indicate corresponding parts.

Referring to the drawings, A represents the base-plate, and B the convex face-plate, of my improved mount. The base-plate A is provided with a circular or other groove *a*, of any suitable cross-section, that corresponds in size and shape with the circumference of the face-plate B, so that the edge of the face-plate B is seated within the groove *a*. The convex face-plate B is sealed into the groove of the base-plate by a circumferential ring of suitable cement C, made of asphaltum or a mixture of caoutchouc and lime or any other suitable compound, according to the preserving liquid with which the space between the base and face plates is to be filled. The convex face-plate B is provided, preferably near the circumference, with a small aperture *b*, which serves for the purpose of filling the space between the base and face plates with alcohol, formalin, or other preserving solution. The interior space can be filled entirely through the aperture *b* with the preserving liquid under atmospheric pressure, so that every particle of air is forced out, and no air-bubbles, which impair the appearance of the specimen, are formed at the interior of the mount. After the preserving liquid is filled into the space between the base and face plates the small opening *b* is closed by a plug *b'*, of suitable cement. The aperture *b* is formed in the face-plate B by means of a fine diamond drill. In place of boring the aperture through the convex face-plate it can also be arranged in the base-plate; but in this case the interior space between the plates could not be so conveniently filled as in the case when the space is filled through the hole in the face-plate. When it is desired to hide the plug *b'* of the filling-aperture *b*, it can be placed so near the circumference of the convex face-plate that it may be covered by the sealing-cement ring C.

My improved mount can be made in different sizes, according to the size of the objects to be preserved, it being equally adapted for large and small specimens.

The advantages of my improved mount are that it is not affected by changes of temperature and not liable to leak or admit air under the influence of heat and that it can be readily opened again by opening the aperture, withdrawing the preserving liquid, and removing the face-plate by heating the sealing-cement. It can be used with equal advantage for preserving dry specimens, in which case the aperture *b* is used for injecting some preserving powder or solution before exhausing the air from the space between the base and face plates. Lastly, as the annoying air-bubbles formed in the mounts heretofore in use are entirely dispensed with the specimen preserved in my improved mounts presents a much better appearance.

Having thus described my invention, I claim as new and desire to secure by Letters Patent—

1. A mount for natural-history specimens, consisting of a base-plate having a groove, a convex face-plate fitted in said groove and provided with a small aperture, a sealing-ring of cement for sealing the circumference of the face-plate into said groove, and a sealing-plug for the aperture, substantially as set forth.

2. A mount for natural-history specimens, comprising a flat base-plate and a rounded concave cover-plate adapted to be secured at its edges to the base-plate by cementation, said cover-plate having an aperture therein adapted to be closed by a cement, substantially as set forth.

In testimony that I claim the foregoing as my invention I have signed my name in presence of two subscribing witnesses.

OSCAR STRÜMPELL.

Witnesses:
PAUL GOEPEL,
M. HENRY WURTZEL.